June 19, 1934.　　　S. L. BROWN　　　1,963,775
REVERSE DRIVE
Filed Oct. 20, 1933　　　3 Sheets-Sheet 1

Inventor
STEPHEN L. BROWN
By Edward R. Inman Attorney

June 19, 1934.　　　　　S. L. BROWN　　　　1,963,775
REVERSE DRIVE
Filed Oct. 20, 1933　　　　3 Sheets-Sheet 2

Inventor
STEPHEN L. BROWN
By Edward R. Inman
Attorney

June 19, 1934.    S. L. BROWN    1,963,775
REVERSE DRIVE
Filed Oct. 20, 1933    3 Sheets-Sheet 3
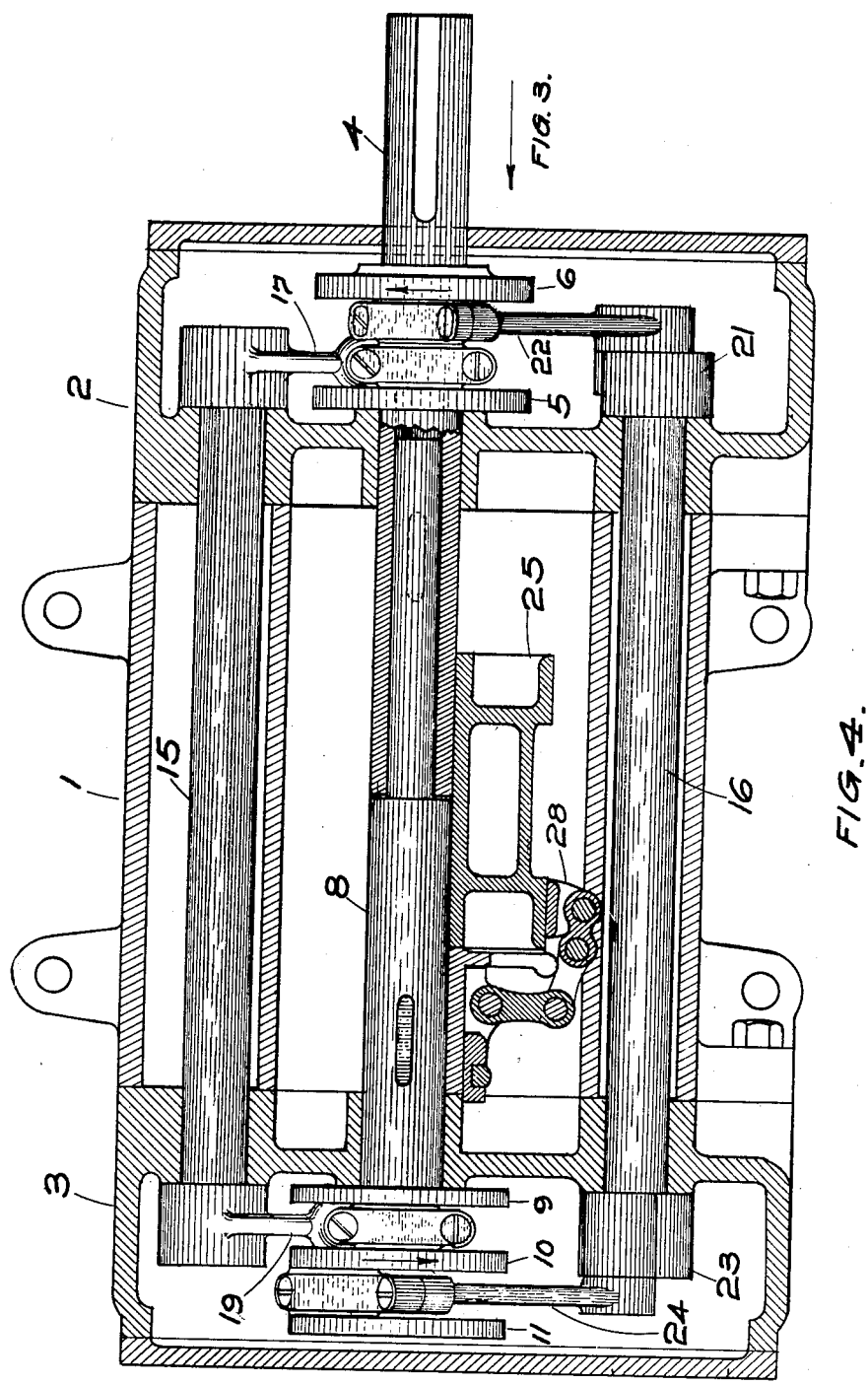
STEPHEN L. BROWN
By Edward R. Inman
Attorney Patented June 19, 1934

1,963,775

UNITED STATES PATENT OFFICE 1,963,775

REVERSE DRIVE

Stephen L. Brown, Franklin, Pa.

Application October 20, 1933, Serial No. 694,435

3 Claims. (Cl. 74—14)

This invention relates to a reverse clutch pulley for use on internal combustion engines and other power appliances in which the direct drive is in one direction only.

Applicant is aware that there are various types of reverse clutch pulleys which employ various combinations of gears to produce a reverse drive of the pulley, but he is also aware that this type of geared pulley is objectionable in the respect that the gears are a weak element in such an organization because they frequently become damaged and broken in service.

It is the object of this invention to supply a reverse drive in which gears of the toothed type such as bevel gears and spur gears of various types are dispensed with, and instead thereof a reversal of the transmission belt pulley is attained by means of a combination of shafts, cranks, rocker arms and connecting rods; one example of such structure is clearly shown in the accompanying drawings in which:

Fig. 4 is a horizontal section on line IV—IV of Fig. 2.

The construction shown in said drawings is substantially as follows:

As a general mounting and containing housing for my improved reverse clutch pulley, I employ a bed or housing which is shown as consisting of three sections, namely, a central section 1, the direct drive end section 2 and a reverse drive end section 3.

Let it be noted that the terms "direct drive section", or "direct section" and "reverse drive section" or "reverse section", will be generally employed throughout this specification and in the claims as a designation for the two ends of the organization as well as the operative elements positioned at said ends.

Figure 3:
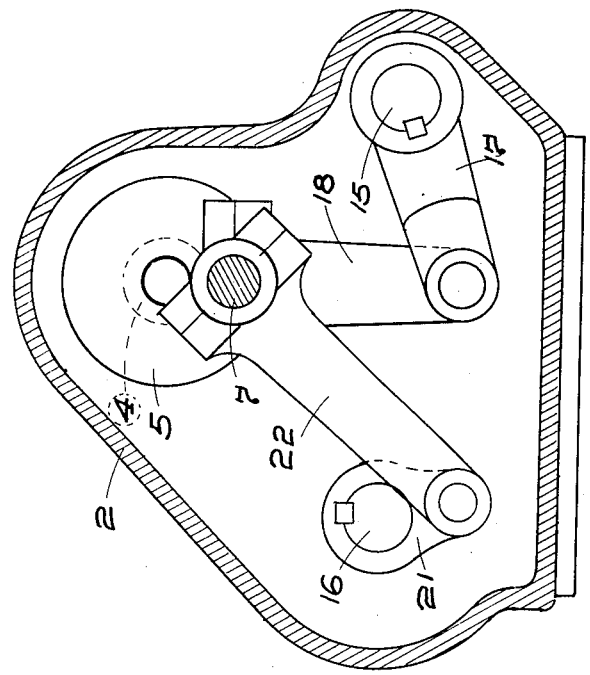
Fig. 3 is a vertical section on line III—III of Fig. 1.
Figure 2:
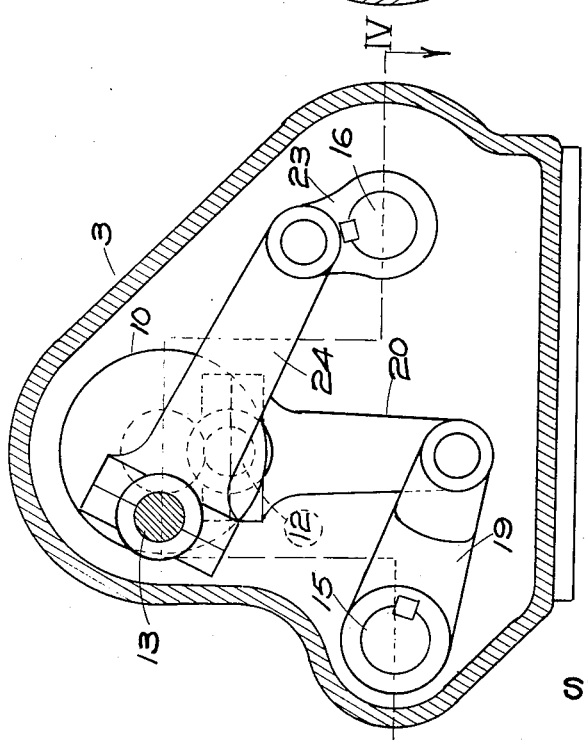
Fig. 2 is a vertical section on line II—II of Fig. 1.

The primary power element of this organization comprises a shaft structure consisting of two sections, namely, a direct drive section 4 which is equipped with a single crank mechanism consisting of two disks, 5 and 6, which carry between them an integral crank pin 7; also a reverse drive section 8 which is equipped with three integral disks 9, 10 and 11 which carry between them the integral crank pins 12 and 13. In Figs. 2 and 3 the outside disks 6 and 11 are removed, and the respective crank pins 7 and 13 are accordingly cross hatched.

The outer end of said primary shaft 4 is supplied with a pulley 14 to which power is transmitted by means of a belt to my reverse clutch pulley organization, from any suitable source of power, which is usually an internal combustion engine, and for this reason this end of the organization is termed the direct drive end because the drive transmitted therefrom to any driven machine is in the same direction as the direction of rotation of said pulley 14.

For the purpose of imparting a reverse revoluble motion to the reverse section 8 of the primary power shaft, members and elements are employed, combined and cooperated in the following manner. Two secondary shafts 15 and 16 are employed which extend longitudinally through the bed, as clearly shown in Fig. 4.

Said shaft 15 is supplied at the direct drive end thereof, as indicated in Fig. 3, with a rigidly attached oscillating lever 17; and to the other, swinging end of said lever 17 is attached the lower end of a connecting rod 18; the upper end of said rod 18 is connected to the crank pin 7 which is the single pin of the drive end of the organization, and whereby oscillative motion is transmitted to said shaft 15; at its reverse end shaft 15—for the purpose of transmitting reverse motion to reverse section 8 aforesaid,—is supplied with an oscillative lever 19 from the outer swinging end of which, motion is transmitted to crank pin 12 by means of the connecting rod 20, as indicated in Fig. 2.

In order to supplement and complete the motion above set forth, so as to impart to said section 8 a positive, reverse, rotary motion, shaft 16 has rigidly attached thereto at the direct end, as indicated in Fig. 3, a short, downwardly extending, oscillative lever 21, to the lower swinging end of which is secured one end of a connecting rod 22, the other end of said rod being connected to said single crank pin 7 at the drive end of the organization. At its reverse end, shaft 16, as indicated in Fig. 2, has rigidly connected thereto a short, upwardly extending, oscillative lever 23, the upper swinging end of which is connected to the crank pin 13 by means of a connecting rod 24.

Upon said primary shaft organization is revolubly mounted a reverse clutch pulley 25; adjacent the direct drive end of said pulley 25 is mounted a direct drive clutch organization 26 which is keyed to the direct drive section 4 of said main shaft. This clutch mechanism 26 is adapted through the medium of lever 27 to be engaged with and disengaged from the adjacent cooperative end of pulley 25. Upon the reverse drive section 8, and in co-operative relation to the adjacent end of said pulley 25, is mounted and keyed a reverse drive clutch organization 28 which is adapted through the medium of a lever 29 to be operatively engaged with and disengaged from the adjacent end of said pulley 25; by placing said levers 27 and 29 in their intermediate positions, as by means of the connecting rod 30 and lever 31, both clutch organizations are disengaged. These clutch mechanisms may be any suitable type, such as the jaw type shown, or the multiple disk type, or any other suitable form of friction type, and because the type shown is well known, no specific claim is directed thereto in the present organization.

Figure 1:
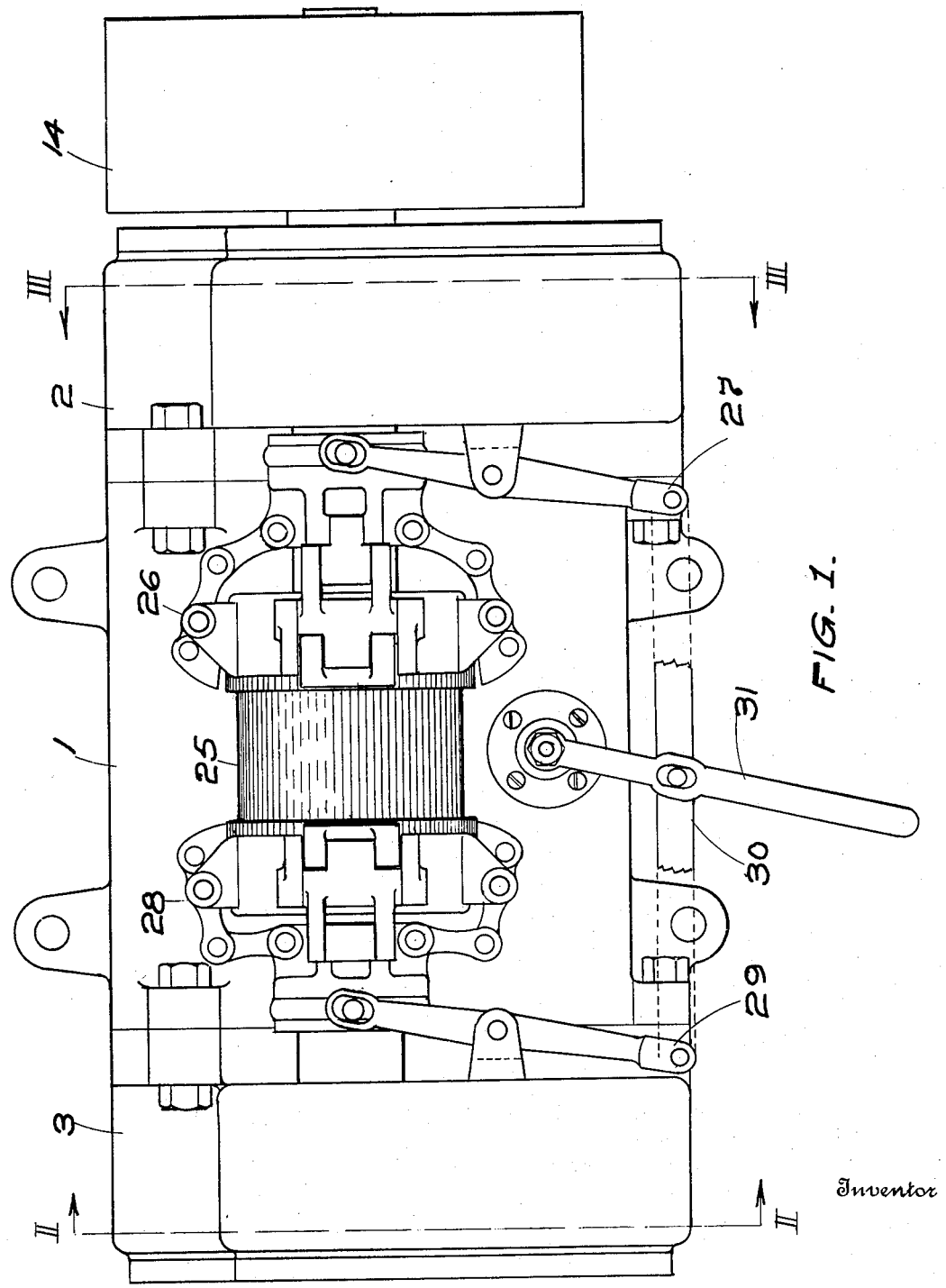
Fig. 1 is a plan view of a complete unit of my improved reverse clutch pulley.

Fig. 4 is fragmentary in the respect that the longitudinal section of the clutch there shown includes but one side of the pulley 25 and but one side of the reverse clutch organization 28; this is sufficient, however, when taken in connection with Fig. 1 to clearly illustrate said pulley 25 and its related clutch mechanism.

The surface shaded portions of Fig. 4 illustrate the essentially novel features of this invention; the design of the bed and the type of clutch employed may be varied to conform to the differing uses in which my improved organization may be employed. Shaft 4 could be directly connected to the crank-shaft of an engine by means of a rigid coupling.

By an inspection of Fig. 2 it will be readily noted that the crank pins 12 and 13 are spaced apart arcwise to the extent of approximately 90 degrees, and by an inspection of Fig. 4, that said crank pins are spaced apart laterally by the intervening crank disk 10.

Also by a reference to Fig. 4 it will be noted that the direction of rotation of the respective sections of the main drive shaft organization is noted by the arrow upon disk 6, and the arrow upon disk 10.

I claim the following:

1. In a reverse drive, a primary power shaft organization comprising two axially-aligned, reversely revoluble sections, a power-transmission pulley freely mounted upon said power shaft organization in such manner that its ends overlap the adjacent ends of said sections respectively; a clutch organization carried by each of and keyed to said sections and positioned in engageable relation to the respectively adjacent ends of said pulley; means adapted to cause the rotation of said sections in opposite directions, said means consisting of two secondary shafts together with crank elements secured to said sections, rocker arms secured to the ends of said secondary shafts with connecting rods connecting said cranks to said rocker arms; and means for causing the simultaneous engagement of one and the disengagement of the other of said clutch mechanisms with and from their respective ends of said pulley.

2. In a reverse drive, a primary power shaft organization comprising two axially-aligned, reversely revoluble sections, one of which is adapted to receive power from an extraneous source, a belt pulley freely mounted upon said power shaft organization in such manner that its ends overlap the adjacent ends of said sections respectively; a clutch organization carried by each of and keyed to its respective section and arranged in engageable relation to the respectively adjacent ends of said pulley; means adapted to cause the rotation of said sections in opposite directions, said means consisting of two secondary shafts arranged in parallel relation to said primary shaft together with crank members secured to the respective ends of said sections, rocker arms secured to the ends of said secondary shafts with connecting rods connecting said crank members to said rocker arms; and means operable to secure the simultaneous engagement of one and the disengagement of the other of said clutch organizations with and for their respectively associated ends of said pulley.

3. In a reverse drive, a suitable housing or mounting structure, a direct and reverse primary power transmitting shaft organization comprising two axially-aligned, independently revoluble sections, a single crank carried adjacent the outer end of the directly rotating section, two cranks carried adjacent the outer end of the reversely rotating section, said two cranks being spaced apart both laterally and arcwise, a belt pulley revolubly mounted upon said primary shaft organization adjacent the central portion thereof, two secondary, rotative transmission shafts mounted in said housing and positioned laterally in relatively opposite directions from said primary shaft, also extending parallel therewith, a rocker arm actuatively secured to the direct end of each of said secondary shafts, a connecting rod for each of said rocker arms whereby they are respectively connected to and actuated by said single crank, a rocker arm secured to and actuated by the outer reverse end of each of said secondary shafts, a connecting rod for each of and whereby said reverse rocker arms are respectively connected to one of said two cranks so as to drive their attached section of said primary shaft in a direction reversely to the direction of revolution of the other section thereof, and a clutch organization mounted upon and keyed to each section of said primary shaft respectively, adjacent to the ends of said pulley and selectively engageable and disengageable with and from their respectively adjacent ends, as and for the purpose set forth, one section of said primary power shaft being adapted to be suitably driven by extraneous power.

STEPHEN L. BROWN.